(12) United States Patent
Stein

(10) Patent No.: US 6,214,754 B1
(45) Date of Patent: Apr. 10, 2001

(54) SILICON NITRIDE COATING COMPOSITIONS

(75) Inventor: Michael Alan Stein, King of Prussia, PA (US)

(73) Assignee: Electro-Science Laboratories, Inc., King of Prussia, PA (US)

( * ) Notice: Subject to any disclaimer, the term of this patent is extended or adjusted under 35 U.S.C. 154(b) by 0 days.

(21) Appl. No.: 09/381,494

(22) PCT Filed: Mar. 19, 1998

(86) PCT No.: PCT/US98/05528

§ 371 Date: Sep. 21, 1999

§ 102(e) Date: Sep. 21, 1999

(87) PCT Pub. No.: WO98/42505

PCT Pub. Date: Oct. 1, 1998

Related U.S. Application Data
(60) Provisional application No. 60/041,331, filed on Mar. 21, 1997.

(51) Int. Cl.[7] .................................................. C03C 3/076
(52) U.S. Cl. ........................ 501/55; 428/325; 428/428; 428/432; 428/469; 428/472; 428/697; 428/698; 428/699; 428/704; 428/901; 252/512; 252/514; 252/518.1; 252/519.5; 252/521.4; 252/521.3; 501/11; 501/53; 501/55
(58) Field of Search ................................. 428/428, 432, 428/698, 325, 433, 469, 472, 901, 704, 697, 699; 252/514, 512, 518.1, 519.5, 521.4, 521.3

(56) References Cited

U.S. PATENT DOCUMENTS

| | | | |
|---|---|---|---|
| 4,374,391 | | 2/1983 | Camlibel et al. ........................ 357/17 |
| 4,857,486 | * | 8/1989 | Ebata et al. .............................. 501/21 |
| 4,861,646 | * | 8/1989 | Barringer et al. ..................... 428/210 |
| 4,906,406 | | 3/1990 | Hormadaly ............................ 252/519 |
| 4,980,086 | * | 12/1990 | Hiraiwa et al. ........................ 252/511 |
| 5,236,737 | * | 8/1993 | Linton ................................. 427/126.3 |
| 5,376,596 | | 12/1994 | Toluda et al. ........................... 501/19 |
| 5,468,695 | | 11/1995 | Carroll et al. .......................... 501/79 |
| 5,480,846 | | 1/1996 | Sundberg et al. ....................... 501/65 |

FOREIGN PATENT DOCUMENTS

WO 93/06053   4/1993   (WO) ............................. C03C/14/00

* cited by examiner

*Primary Examiner*—Deborah Jones
*Assistant Examiner*—Lymarie Miranda
(74) *Attorney, Agent, or Firm*—Weingarten, Schurgin, Gagnebin & Hayes LLP

(57) ABSTRACT

The present invention relates to thick film coating compositions which adhere particularly well to silicon nitride substrates and accordingly may be used in the manufacture of heater apparatus using such substrates. Such thick film coating materials comprise a borosilicate glass matrix containing an amount of a metal oxide sufficient to enable said thick film coating material to react with a silicon nitride substrate to promote adherence thereto; and desirably further contains ceramic powders and/or metal or metal-containing compound powders and/or flakes.

18 Claims, No Drawings

SILICON NITRIDE COATING COMPOSITIONS

CROSS REFERENCE TO RELATED APPLICATIONS

This application claims priority to U.S. Provisional application Ser. No. 60/041,331, filed Mar. 21, 1997, the disclosure of which is incorporated herein by reference.

STATEMENT REGARDING FEDERRALY SPONSORED RESEARCH OR DEVELOPMENT

N/A

BACKGROUND OF THE INVENTION

The present invention relates to compositions which are useful as dielectric or conductive coatings for substrates and which have been surprisingly found to be particularly adherent to silicon nitride substrates.

The electronics and electrical industries have placed increasing demands on substrates for transferring and dissipating larger and larger quantities of power. Dielectric and conductive coating materials are used in a growing number of applications, including under-the-hood automotive circuitry, surface-mounted components, hybrid circuit boards, multi-chip modules, and heaters, heat sensors and heat regulators in industrial and domestic applications. Silicon nitride ($Si_3N_4$) is a desirable substrate for use in such applications, but dielectric or conductive coatings presently available do not adhere well or stably to $Si_3N_4$, raising the need for new coatings that will be acceptable for this purpose.

BRIEF SUMMARY OF THE INVENTION

The present invention relates to useful thick film coating materials which may be applied to substrates, silicon nitride substrates in particular, so as to desirably enable their use in making apparatus such as heaters. Broadly, such thick film coating materials comprise a borosilicate glass matrix containing an amount of a metal oxide sufficient to enhance adherence to the silicon nitride substrate; and desirably further contain ceramic powders and/or metal or metal-containing compound powders and/or flakes.

In an embodiment, a thick film coating material in accordance herewith comprises a borosilicate glass matrix having 10 to 80% $SiO_2$; 7 to 24% $B_2O_3$; 0 to 65% ZnO and 0 to 25% PbO, all percentages by total weight of the borosilicate glass. The disclosure is further directed towards silicon nitride substrates having applied thereto the thick film coating materials described herein, which may also further contain ceramic powders and/or metal or metal-containing compound powders and/or flakes.

DETAILED DESCRIPTION OF THE INVENTION

We have found that thick film coatings comprising a certain borosilicate glass matrix, which may desirably further be filled with ceramic and/or metal and/or metal-containing compound powders or flakes, possesses the necessary dielectric and/or conductive properties, and sticks well to $Si_3N_4$ after firing, e.g., after screen printing. It is believed that the enhanced adherence to silicon nitride is promoted by the presence of a sufficient amount of certain metal oxides which are believed to attack the surface of the silicon nitride substrate and react with it to enhance adherence, but not enough to generate a significant amount of outgassing (producing, for example, nitrogen dioxide).

Suitable metal oxides include boric oxide ($B_2O_3$), copper oxide (CuO or $Cu_2O$), cadmium oxide (CdO), lead oxide (PbO), sodium oxide ($Na_2O$), barium oxide (BaO), potassium oxide (K2O), calcium oxide (CaO), magnesium oxide (MgO), or zinc oxide (ZnO). While CdO and PbO may be included in the glass composition of the invention, large amounts of these oxides, i.e., more than 25% of the weight of the borosilicate glass composition, as well as other strongly fluxing materials, are believed to attack the silicon nitride surface too vigorously, especially at desirable thick film firing temperatures (typically around 850° C.), resulting in excessive outgassing and harming the integrity of the film, and causing blisters, cracks, etc. These oxides also shift the linear thermal expansion coefficient further from that of the substrate, causing undesirable stresses in the film.

One example of a commercially available borosilicate glass matrix which may be used in the present invention is a zinc borosilicate glass available from Corning Glass Works (Corning, N.Y.) as Corning 7574. This material has a softening point of 646° C., significantly below the desired firing peak temperature of 850° C.

The thick film coating compositions also include ceramic powders and/or metal or metal-containing compound powders and/or flakes, e.g., precious metals like silver, gold, palladium, and platinum; base metals such as copper, nickel, aluminum, or chromium; and precious metal compounds such as ruthenium or iridium oxides, or ruthenates. Specific examples include ruthenium dioxide, palladium powder, silver powder, and aluminum oxide fillers. The amount of such ceramic powders and/or metal or metal-containing compound powders and/or flakes is sufficient to impart the desired resistance or conductivity, and is within the skill of those in the art.

One of the applications contemplated to be within the scope of this disclosure is the manufacture of heaters wherein heater tracks are formed on a silicon nitride surface by applying a conductive coating in accordance with this disclosure. One means of doing this is as disclosed above, i.e., forming a conductive film containing glasses in accordance with this disclosure and conductive powder or flake filler in a screen printing vehicle which is printed on the substrate in the desired track pattern, then fired to form a permanent coating on the silicon nitride surface.

The screen printing vehicle or carrier can be any of the standard organic vehicles or print media typically used in the art for thick film screen printing. These carriers need not be listed here insofar as they are well known and designed simply to permit the application of the film to the substrate, then burn out during firing, leaving only the inorganic materials mentioned above. For example, we have used a carrier comprising ethyl cellulose dissolved in Texanol (propionic acid, 2-methyl-, monoester with 2,2,4-trimethyl-1,3-pentanediol.)

Protective or dielectric films or coatings made from the thick film coating materials disclosed herein may be formed by applying these materials in powder form in a screen printing carrier or vehicle, then fired to form a protective or dielectric coating. Dielectric (glass or ceramic) fillers, with much higher softening points, can be also be added to the compositions disclosed herein, for greater ruggedness, greater opacity, reduced glass flow initially or in subsequent firings, or other specific electrical or physical properties.

Other compounds which do not adversely affect the advantageous properties of the basic composition, such as calcium carbonate ($CaCO_3$), may also be added if desired.

The coatings disclosed herein may be applied to any base substrate material, such as silicon nitride. The properties of the coating are preferably matched to the substrate, e.g., thermal expansion coefficient, so that the coating adheres well to the substrate, and does not fracture or delaminate upon heating and cooling. Desirably, the thick film coating materials disclosed herein have a thermal expansion coefficient approximating that of silicon nitride e.g., 3 to 4 ppm/°C., so that under the firing schedule of device manufacture, and under the use conditions of the final device, the coating will not delaminate, blister, or crack. The presently disclosed thick film compositions have this property.

Low profile heaters using coated silicon nitride substrates as disclosed herein may be made by screen printing heating elements of a desired resistance from the disclosed thick film coating materials in a desired path configuration that will yield the desired temperature uniformity and heat-up rate potential. Conductive contact pads which may also be made from the thick film coating materials disclosed herein, are printed and fired in contact with to the heating tracks to allow a current to be supplied.

It should be noted that the invention should not be limited to the preferred embodiments of the invention disclosed herein. Other embodiments and variations will be apparent to those of ordinary skill in the art without departing from the inventive concepts contained herein.

What is claimed is:

1. A thick film coating material adherent on a silicon nitride substrate comprising a borosilicate glass matrix containing an amount of a metal oxide sufficient to enable said thick film coating material to react with said silicon nitride substrate to promote adherence thereto; and ceramic powders and/or metal or metal-containing compound powders and/or flakes.

2. The thick film coating material of claim 1 wherein the amount of ceramic powders and/or metal or metal-containing compound powders and/or flakes in said borosilicate glass matrix is sufficient to provide a desired resistance or conductivity.

3. The thick film coating material of claim 1, wherein said borosilicate glass matrix contains 10 to 80% $SiO_2$; 7 to 24% $B_2O_3$; 0 to 65% ZnO and 0 to 25% PbO, all percentages by total weight of the glass matrix.

4. The thick film coating material of claim 1, wherein said metal oxide is selected from the group consisting of boric oxide ($B_2O_3$), copper oxide (CuO or $Cu_2O$), cadmium oxide (CdO), lead oxide (PbO), sodium oxide ($Na_2O$), barium oxide (BaO), potassium oxide (K2O), calcium oxide (CaO), magnesium oxide (MgO), and zinc oxide (ZnO).

5. The thick film coating material of claim 1, further comprising $CaCO_3$.

6. The thick film coating material of claim 1, further having a thermal expansion coefficient approximating 3 to 4 ppm/°C., such that said thick film coating material will not delaminate, blister, or crack after coating and firing onto a silicon nitride substrate.

7. The thick film coating material of claim 1, wherein said ceramic powders and/or metal or metal-containing compound powders and/or flakes are selected from the group consisting of silver, gold, palladium, and platinum; copper, nickel, aluminum, or chromium; and ruthenium or iridium oxides or ruthenates.

8. A coated silicon nitride substrate having adherently coated thereupon a thick film coating material comprising a borosilicate glass matrix containing an amount of a metal oxide sufficient to enable said thick film coating material to react with a silicon nitride substrate to promote adherence thereto.

9. The coated silicon nitride substrate of claim 8 wherein said borosilicate glass matrix further comprises ceramic powders and/or metal or metal-containing compound powders and/or flakes.

10. The coated silicon nitride substrate of claim 8 wherein the amount of ceramic powders and/or metal or metal-containing compound powders and/or flakes in said borosilicate glass matrix is sufficient to provide a desired resistance or conductivity.

11. The coated silicon nitride substrate of claim 8, wherein said borosilicate glass matrix contains 10 to 80% $SiO_2$; 7 to 24% $B_2O_3$; 0 to 65% ZnO and 0 to 25% PbO, all percentages by total weight of the borosilicate glass.

12. The coated silicon nitride substrate of claim 8, wherein said metal oxide is selected from the group consisting of boric oxide ($B_2O_3$), copper oxide (CuO or $Cu_2O$), cadmium oxide (CdO), lead oxide (PbO), sodium oxide ($Na_2O$), barium oxide (BaO), potassium oxide (K2O), calcium oxide (CaO), magnesium oxide (MgO), and zinc oxide (ZnO).

13. The coated silicon nitride substrate of claim 8, wherein said thick film coating composition further comprises $CaCO_3$.

14. The coated silicon nitride substrate of claim 8, wherein said thick film coating composition has a thermal expansion coefficient approximating 3 to 4 ppm/°C., such that said thick film coating material will not delaminate, blister, or crack after coating and firing onto a silicon nitride substrate.

15. The coated silicon nitride substrate of claim 8, wherein said ceramic powders and/or metal or metal-containing compound powders and/or flakes are selected from the group consisting of silver, gold, palladium, and platinum; copper, nickel, aluminum, or chromium; and ruthenium or iridium oxides or ruthenates.

16. The thick film coating of claim 1, wherein said metal oxide is CdO and/or PbO, each present at 0–25% of the weight of said borosilicate glass.

17. The coated silicon nitride substrate of claim 8, wherein said metal oxide is CdO and/or PbO, each present at 0–25% of the weight of said borosilicate glass.

18. A method for making a silicon nitride substrate coated with a thick film coating material comprising a borosilicate glass matrix containing an amount of a metal oxide sufficient to promote the adherence of said thick film coating material to said silicon nitride substrate, comprising a. preparing a borosilicate glass matrix comprising 10–80% SiO2, 7–24% B2O3, 0–65% ZnO and 0–25% PbO, b. adding to said borosilicate glass matrix one or more metal oxides selected from the group consisting of boric oxide, copper oxide, cadmium oxide, lead oxide, sodium oxide, barium oxide, potassium oxide, calcium oxide, magnesium oxide or zinc oxide, c. optionally adding ceramic powders and/or metal or metal-containing compound powders and/or flakes to said borosilicate glass matrix, d. applying said borosilicate glass matrix and additives therein to said silicon nitride substrate, and e. firing said coated silicon nitride to approximately 850° C.

* * * * *